United States Patent [19]
Ziegler

[11] Patent Number: 5,102,602
[45] Date of Patent: Apr. 7, 1992

[54] ADJUSTABLE DIEHEAD

[75] Inventor: William E. Ziegler, Horton, Mich.

[73] Assignee: Plastics USA Corporation, Williamston, Mich.

[21] Appl. No.: 532,877

[22] Filed: Jun. 4, 1990

[51] Int. Cl.$^5$ .................. B29C 47/22; B29C 47/96; B29C 49/04
[52] U.S. Cl. .................. 264/209.2; 264/540; 264/565; 264/209.8; 264/40.5; 425/141; 425/532; 425/581; 425/382.4; 425/466; 425/151
[58] Field of Search .............. 264/541, 540, 176.1, 264/177.16, 209.8, 209.2, 565, 40.5; 425/140, 141, 145, 380, 381, 465, 466, 192 R, 382.3, 467, 190, 532, 382.4, 151

[56] References Cited

U.S. PATENT DOCUMENTS

| | | |
|---|---|---|
| 2,991,504 | 7/1961 | Eppler .................. 425/466 |
| 3,019,481 | 2/1962 | Negoro .................. 425/465 |
| 3,221,371 | 12/1965 | Stevens .................. 425/465 |
| 3,386,132 | 6/1968 | Fischer . |
| 3,390,430 | 7/1968 | Lynch . |
| 3,535,739 | 12/1970 | Mehnert . |
| 3,564,653 | 2/1971 | Sparks et al. . |
| 3,702,751 | 3/1973 | Mehnert . |
| 3,860,372 | 1/1975 | Newman, Jr. . |
| 3,895,900 | 7/1975 | Herold et al. . |
| 4,047,868 | 9/1977 | Kudo et al. . |
| 4,382,766 | 5/1983 | Feuerherm .................. 425/465 |
| 4,465,449 | 8/1984 | Hornbeck . |
| 4,472,129 | 9/1984 | Siard .................. 264/541 |
| 4,518,343 | 5/1985 | Seiffert .................. 425/381 |

FOREIGN PATENT DOCUMENTS

| | | | |
|---|---|---|---|
| 61-175008 | 8/1986 | Japan .................. | 425/141 |
| 63-256419 | 10/1988 | Japan .................. | 425/141 |

Primary Examiner—Jeffrey Thurlow
Assistant Examiner—Mathieu Vargot
Attorney, Agent, or Firm—Ian C. McLeod

[57] ABSTRACT

An improved adjustable diehead assembly for mounting on a plastic extrusion machine is described. A discharge orifice for a parison of plastic is formed by a mandrel and annular member. The annular member is moveable by a holder assembly perpendicular to axis of the mandrel to adjust the orifice. The holder assembly includes cams which act upon the opposed sections of the outside surface of the annular member to adjust the orifice when first and second screws are tightened. A third screw acts upon the annular member to adjust the orifice. The screws are mounted on a front part of the holder assembly on the diehead to allow adjustment of the orifice even when the extrusion machine is operating.

23 Claims, 6 Drawing Sheets

ADJUSTABLE DIEHEAD

BACKGROUND OF THE INVENTION (1) Summary of the Invention

The present invention relates to an improved adjustable diehead which mounts on an extrusion machine for forming plastic tubular parisons which can be subsequently blow molded to produce containers and the like. In particular, the present invention relates to an adjustment means for regulating the discharge orifice of the diehead so that the extruded parison has a uniform circumferential wall thickness.

(2) Prior Art

The prior art has described various types of means for adjusting the discharge orifice of a diehead. Illustrative are U.S. Pat. Nos. 3,386,132 to Fischer; 3,390,430 to Lynch et al; 3,535,739 to Mehnert; 3,564,653 to Sparks et al; 3,702,751 to Mehnert; 3,860,372 to Newman, Jr.; 3,895,900 to Herold et al; 4,047,868 to Kudo et al; and 4,465,449 to Hornbeck. Some of the dieheads are adjustable by adjustment means provided around an annular member providing a mandrel with a discharge orifice which presents safety problems if the adjustment is made during the operation of the extrusion machine. Some dieheads only provide for a gross or rough adjustment in the cross-sectional dimensions of the discharge orifice through vertical movement of a mandrel along its longitudinal axis in relation to an annular member.

In those extrusion machines which provide a means for radially adjusting the dimensions of discharge orifice, the safety of the operation is compromised. The discharge orifice is directly adjacent to and above the moveable components of the extrusion machine. This makes it difficult for an operator to reach behind the machine to gain access to the adjusting elements on the back side of the diehead which control the radial displacement of the angular member relative to the mandrel forming the discharge orifice. The dieheads are usually mounted in line to a common inlet port for the plastic which limits the space needed to adjust the discharge orifice of any particular diehead.

Those machines that provide only for vertical movement of the mandrel dimensions relative to an annular member as a means for adjusting the discharge orifice also have disadvantages. It is difficult to uniformly maintain the temperature of the extruded parison. Also experience has shown that it is difficult to uniformly regulate the pressure gradient of the molten plastic as it extrudes out the discharge orifice. Therefore, the extruded parison typically has a wall thickness that is not uniform even though the discharge orifice may be radially uniform. This can lead to problems in the wall thickness of the molded container being too thin in places which compromise strength and can cause the container to break or tear easily, or too thick in places which results in waste of plastic material.

Mehnert U.S. Pat. No. 3,702,751 describes the problems and overcomes the problems by using a biasing device which acts in concert with a biasing pin controlled by various adjustable means. Such a diehead provides good adjustment between the biasing device and the biasing pin; however, limited control of the annular member is provided around 360° of the longitudinal axis of the mandrel. There is a need for a diehead which provides for precise radial adjustment of the position of the annular member relative to the mandrel around 360° of the longitudinal axis of the mandrel, particularly from the front of the diehead facing the operator. U.S. Pat. No. 3,535,739 to Mehnert describes a more complicated diehead where the same type of control is used to move the annular member. Such a device is very expensive.

OBJECTS

It is therefore an object of the present invention to provide a diehead which allows radial adjustment of the discharge orifice from the front of the diehead. It is further an object of the present invention to provide a diehead which allows for adjustment of the discharge orifice through longitudinal displacement of the mandrel relative to the annular means. Further, it is an object of the present invention to provide a diehead which allows adjustment of the discharge orifice while the extrusion machine is operating. Further still, it is an object of the present invention to provide a diehead which is safe to adjust while the extrusion machine is operating. These and other objects will become increasingly apparent by reference to the following description and the drawings.

IN THE DRAWINGS

FIG. 1 is a front view of two diehead units 10 which are connected in parallel with an extrusion machine (not shown).

FIG. 1A is a plan view of four dieheads 10 connected by a manifold port 27 and dieblock 12 which is fed by a nozzle 33 from an extrusion machine (not shown).

FIG. 2 is a front cross-sectional view of one diehead 10 and associated parts taken along line 2—2 of FIG. 1.

FIG. 3 is a plan cross-sectional view of the diehead 10 of the present invention taken along line 3—3 of FIG. 2 showing holder assembly 50 for moving the annular member 14 relative to mandrel 15.

FIG. 4 is a partial side cross-sectional view of the dieblock 12 and a dieblock 12 choke member 28 taken along line 4—4 of FIG. 2.

FIG. 5 is a partial front cross-sectional view of the bottom half of a diehead 10a and associated parts with the mandrel 15 having a conical section 15i at the discharge orifice 16a that inclines downward and outward from the a—a axis.

FIG. 6 is a front cross-sectional view of a diehead 10b and associated part similar to that depicted in FIG. 2 with an additional adjusting ring 22 mounted in a top circular recess 11b of the feed throat 11.

GENERAL DESCRIPTION

Figure 1:
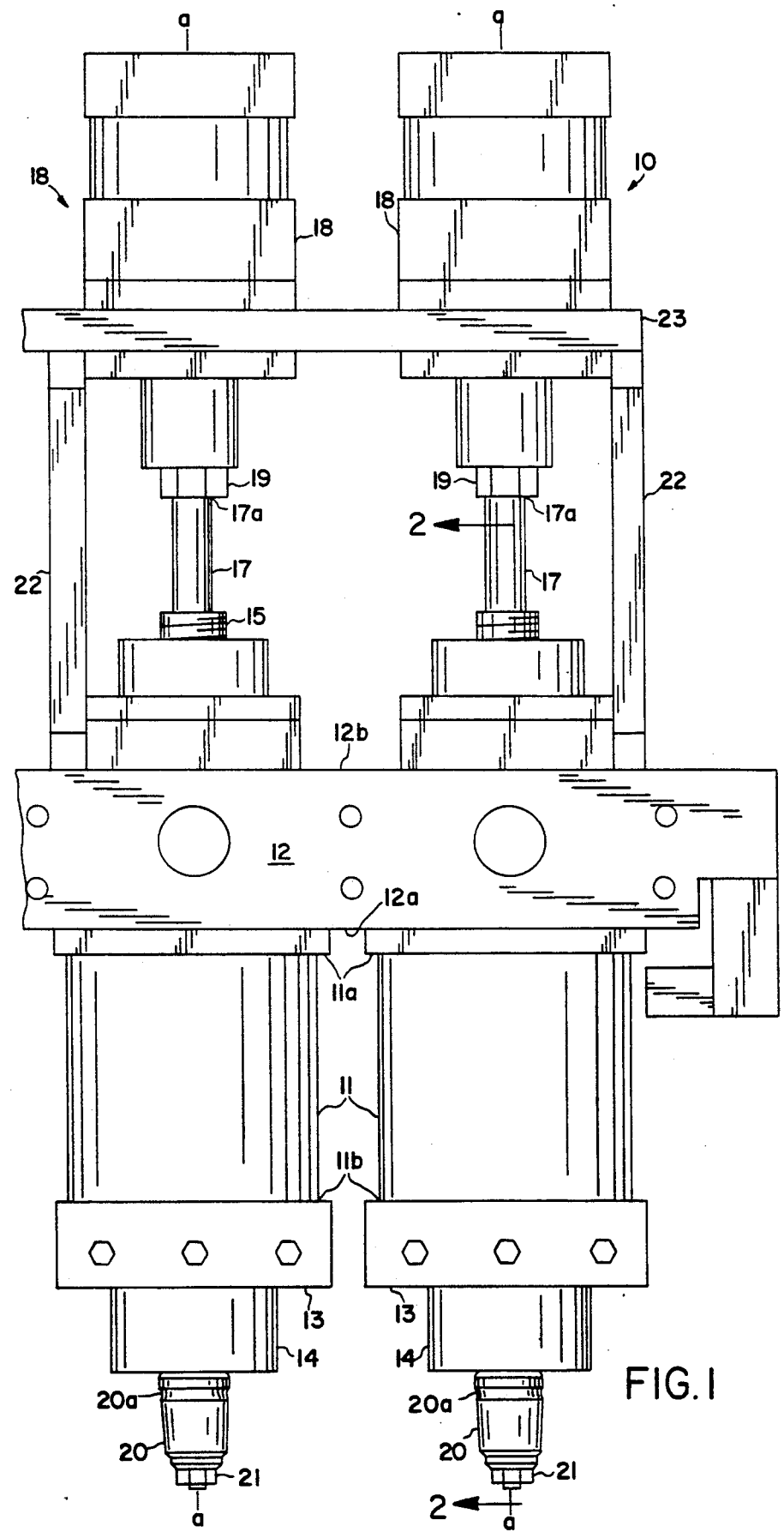

The present invention relates to an adjustable diehead for extrusion of a plastic tube which comprises: mandrel means having a central longitudinal axis; housing means mounted around and supporting the mandrel means along the axis having an inlet opening for the plastic and defining a passage connected to the inlet opening around the mandrel means for extrusion of the plastic; an annular means mounted on the housing means around the mandrel means with a second passage continuous with the first passage and defining an outlet opening for extrusion of the plastic tube between an inside surface of the annular means spaced from the axis and an outside surface spaced from the axis of the mandrel means; dual cam means mounted opposite each other against an outside surface of the annular means; holder means mounted on the housing means around the annular means supporting the cam means; first adjustment means mounted on the holder means so as to engage the annular means; and second adjustment means mounted through the holder means and connected to the cam means with the first adjustment means between and adjacent to the second adjustment means, wherein in use the first adjustment means is moved in the holder means and against the outside surface of the annular means to move the annular means in one direction and wherein the cam means are moved by the second adjustment in the holder means to move the annular means in a second direction away from the first direction.

Further the present invention relates to an adjustment mechanism adapted to be mounted on a diehead with a mandrel means having a longitudinal axis and a housing means mounted around and supporting the mandrel means along the axis and having an inlet opening for the plastic and defining a passage connected to the inlet opening around the mandrel means for extrusion of the plastic as a tube which comprises: an annular means mounted on the housing means around the mandrel means with a second passage continuous with the first passage and defining an outlet opening for the plastic tube through an inside surface of the annular means spaced from the axis and with an outside surface spaced from the axis of the mandrel means; dual cam means mounted opposite each other against an opposed outside surface of the annular means; holder means mounted on the housing means around the annular means supporting the cam means; first adjustment means mounted on the holder means so as to engage the annular means; second adjustment means rotatably mounted through the holder means and connected to each of the cam means with the first adjustment means between and adjacent to the second adjustment means, wherein in use the first adjustment means is moved in the holder means and against the outside surface of the annular means to move the annular means in one direction and wherein the cam means are moved by the second adjustment means in the holder means to move the annular means in a second direction away from the first direction.

It will be appreciated that the diehead of the present invention is preferably useful in a blow molding extrusion machine. The diehead can be used for any type of extrusion of a tube which may or may not be blow molded. Further, there does not need to be a circular cross-section to the tube which is extruded from the diehead. The diehead can be used on other machines where molding is desirable without blow molding. All of these variations will be obvious to one skilled in the art.

The holder assembly can be marketed as a unit to retrofit existing machines. Thus the holder assembly is an article of commerce independent of the diehead.

SPECIFIC DESCRIPTION

Figure 2:
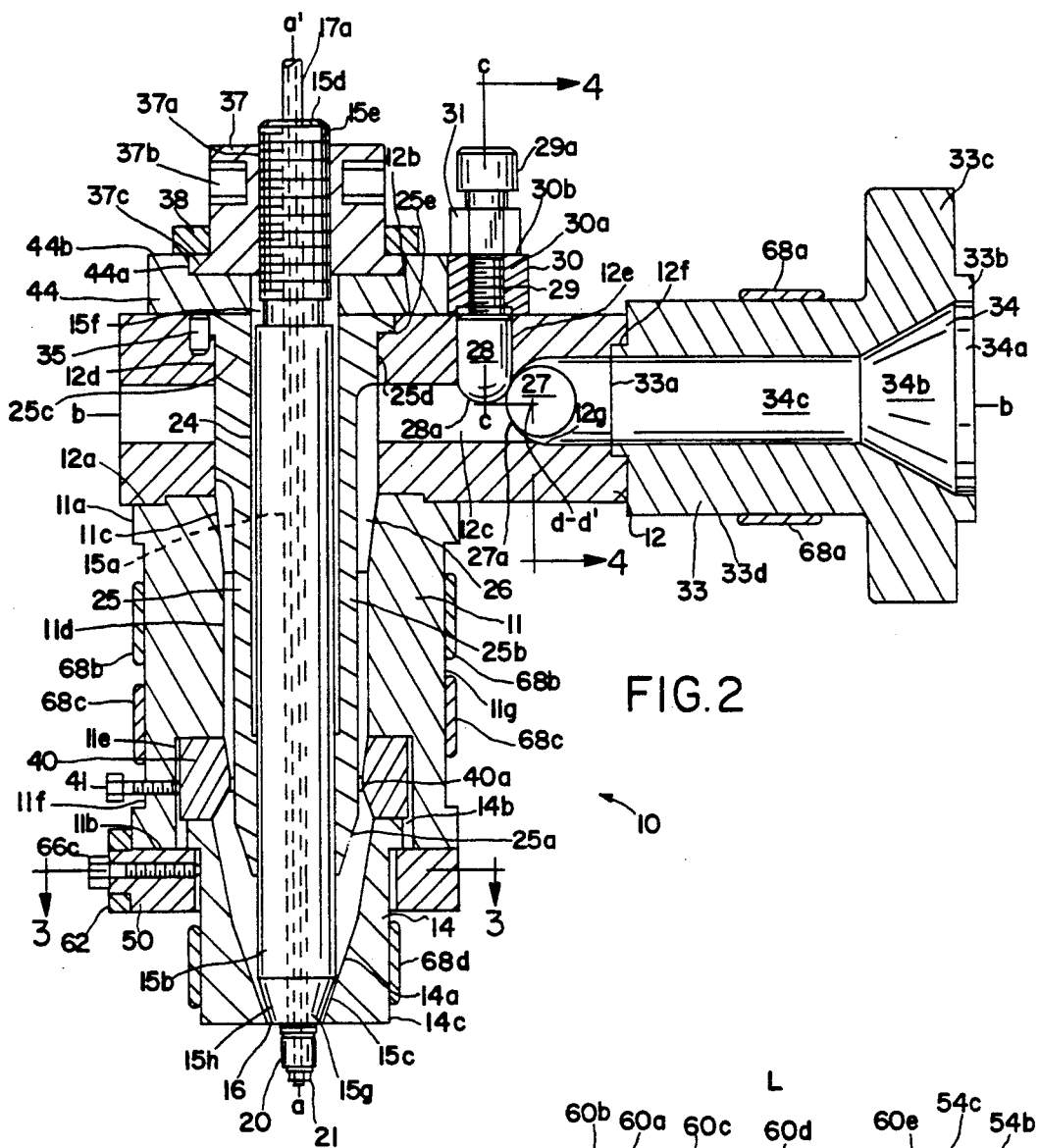

FIG. 1 shows two side-by-side diehead assemblies 10 of the present invention. FIG. 2 shows a cross-section of one diehead assembly 10. Each diehead assembly 10 includes feed throat 11 and is aligned along and around the axis a—a. A proximal end of the feed throat 11 has a flanged section 11a which is secured to the lower surface 12a of a dieblock 12. A holder assembly 50 is attached to the distal end 11b of the feed throat 11 and supports an annular member 14 around axis a—a. A mandrel 15 is mounted inside annular member 14 and along axis a—a so that the mandrel 15 and annular member 14 provide a discharge orifice 16.

The mandrel 15, which has a tubular circular cross-section in section 15a along the axis a—a, is housed inside a sleeve retainer 25, die block 12, feed throat 11, and annular member 14. At the lower end 15b of the mandrel 15, which tapers towards the axis a—a, the discharge orifice 16 is formed between the outside surface 15c of the mandrel 15 and the inside surface 14a of the annular member 14.

A blow pin tube 17 having a circular cross-section around and along the axis a—a is positioned inside the mandrel 15 so as to be moveable along axis a—a. The upper end 17a of the blow pin 17 is secured into the cylinder assembly 18 by the cylinder nut 19 (FIG. 1). The cylinder assembly 18 moves the blow pin 17 and blow pin head 20 along axis a—a through the molding cycle which will be more fully described hereinafter. Directly below and adjacent to the discharge orifice 16 is the blow pin head 20 which is secured to the lower end 17b of the blow pin 17 by hex nut 21, threaded onto the blow pin 17. The cylinder assemblies 18 for the two diehead assemblies 10 are supported between two spaced apart support members 22 mounted on the upper surface 12b of the die block 12. The cylinder assemblies 18 are secured to a horizontal cross-member 23 which extends across the top of the support members 22.

At a proximal end 15d of the mandrel 15 is provided a threaded section 15e. Adjacent the threaded section 15e is a circular groove 15f leading to a space 24 which is provided for a cooling fluid. The mandrel 15 has a circular cross-sectioned opening 15g through which protrudes the lower end 17b of blow pin tube 17 and blow pin head 20 as shown in FIG. 8A and as described more fully hereinafter.

A mandrel sleeve 25 is mounted along the axis a—a on the mandrel 15 intermediate the threaded section 15e and the conical section 15h of the mandrel 15. Adjacent to the conical section 15h, the sleeve 25 has a tapered section 25a which tapers towards the mandrel 15 and an intermediate section 25b with uniform circular cross-section. An enlarged holding section 25c with a circular cross-sectioned portion 25d and with flange 25e is provided adjacent to the intermediate section 25b.

Figure 1A:
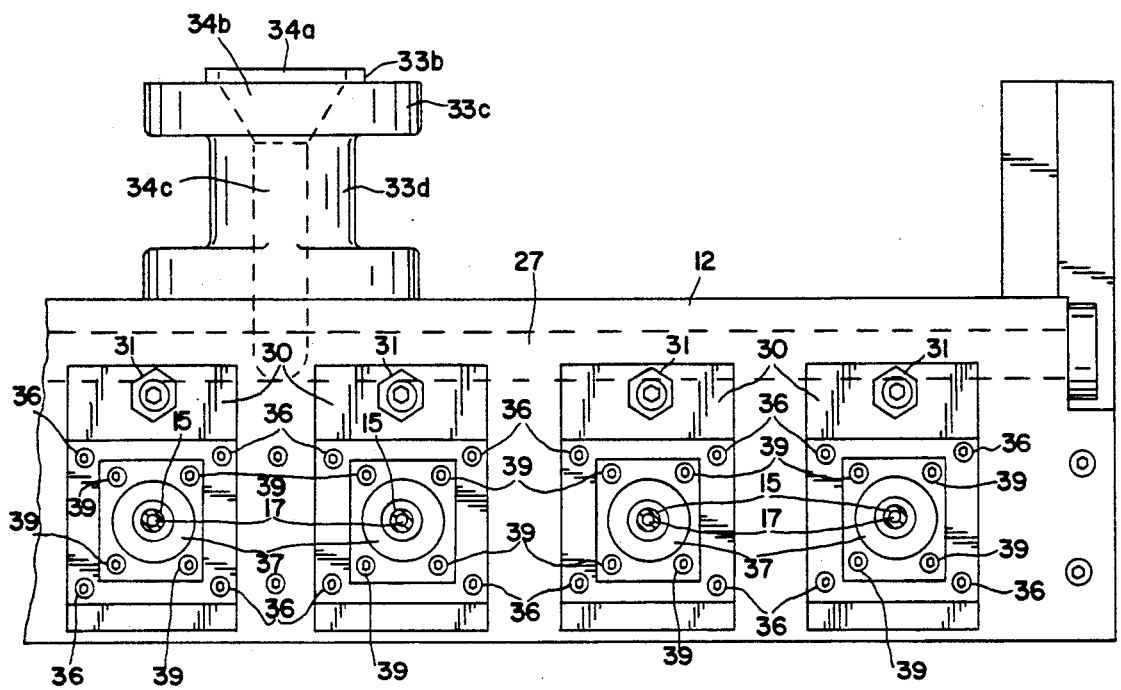
Figure 4:
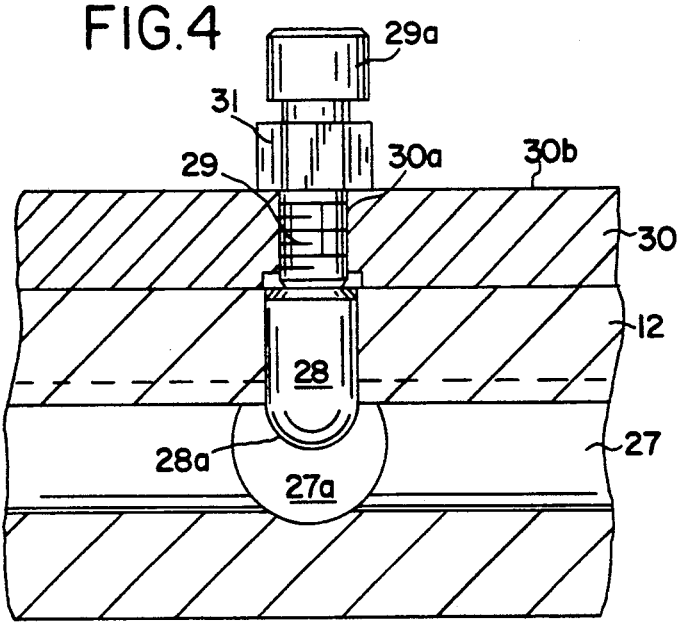

The sleeve 25 is mounted through the die block 12 having a central passage 12c along an axis b—b such that the axis a—a and b—b are perpendicular to each other and such that the passage 12c and the intermediate section 25b of the sleeve 25 are connected to define an annular passage 26 in feed throat 11. The die block 12 has an opening 12d which receives the sleeve 25 such that the section 25d and flange 25e are mounted through the die block 12 with the flange 25e on an upper surface 12b thereof. The die block 12 includes a manifold port 27 along an axis d—d perpendicular to axis b—b such that there is a connection to adjacent diehead assemblies 10 as shown in FIGS. 1A and 4. The die block passage 12c is provided with an opening 12e along axis c—c perpendicular to the axis b—b for receiving a choke member 28 having a rounded end 28a in passage 12c. A threaded member 29 mounts on choke member 28 and extends outside of the die block 12 and passes through a plate 30 mounted on the upper surface 12b of die block 12 with mating threads 30a for threaded member 29. Hex head 29a of threaded member 29 is used to turn the threaded member 29. Nut 31 is mounted on threaded member 29 and engages upper surface 30b of plate 30 to secure the threaded member 29 in place once adjusted. The choke member 28 regulates the flow of plastic in the passage 12c and is necessary since the plastic will have different pressures at various points in manifold port 27 (FIG. 4).

Die block 12 has a circular recess 12f into which is fitted annular protrusion end 33a of nozzle 33. The opposite end 33b of nozzle 33 has a flange 33c which connects to the plastic injection apparatus (not shown). Nozzle 33 forms an injector inlet passage 34 that is centered on the b—b axis. The inlet passage 34 begins with a uniform circular cross-sectioned area 34a which leads to section 34b which tapers toward the b—b axis. Section 34b leads to section 34c and has a uniform circular cross-section leading to passage 12c in die block 12.

Die block 12 has a U-cross-sectioned recess 12g positioned symmetrically around the axis b—b. Manifold port 27 has a circular cross-section along axis d—d (FIG. 4) which is third dimension with respect to axis a—a and axis b—b. Manifold opening 27a is provided in recess 12g and is intermediate and adjacent to the annular protrusion end 33a of nozzle 33 and the choke member 28. The manifold port 27, which connects the die block assemblies 10 in parallel, supplies each of the die block assemblies 10 with extrudable plastic that has been fed through the nozzle 33 (see FIG. 1A).

A roll pin 35 is mounted into the upper surface of flange 25e to secure the sleeve 25 in position on the die block 12. The sleeve retainer 36 is mounted around the axis a—a of mandrel 15 on the upper surface 12b of die block 12 by bolts 36 (FIG. 1A) which thread into the upper surface 12b of the die block 12. The retainer 36 has the circular cross-sectioned recess 36a around the axis a—a onto which is mounted the mandrel nut 37 having the mating threads 37a which engage the threaded section 15e of the mandrel 15. The nut 37 includes spanner openings 37b. The nut 37 has a flange 37c which inserts in the recess 36a. Nut retainer 38, a square cross-sectioned circular ring aligned around the axis a—a, is mounted on the flange 37c and the upper surface 36b of the sleeve retainer 36. The retainer 38 is held in place on an upper surface 36b of the sleeve retainer 36 by bolts 39 (FIG. 1A). Thus movement of the nut 37 is prevented by the retainer 38, when held in place by bolts 39.

On the lower surface 12a of the die block 12 is mounted the feed throat 11 which defines passage 26 with sleeve 25. Adjacent the die block 12 a conical section 11c tapers towards the axis a—a and is spaced from intermediate section 25b of sleeve 25. A cylindrical section 11d is parallel to axis a—a. Feed throat 11 is provided with a lower cylindrical recess 11e around the axis a—a into which is mounted an adjusting ring 40 which is in contact with hex head set screws 41 (one shown) through the side wall 11f of the feed throat 11 around the axis a—a. The ring 40 provides for adjustment of the flow of plastic past surface 40a which is in closely spaced relationship to the lower part of section 25b of sleeve 25.

Figure 3:
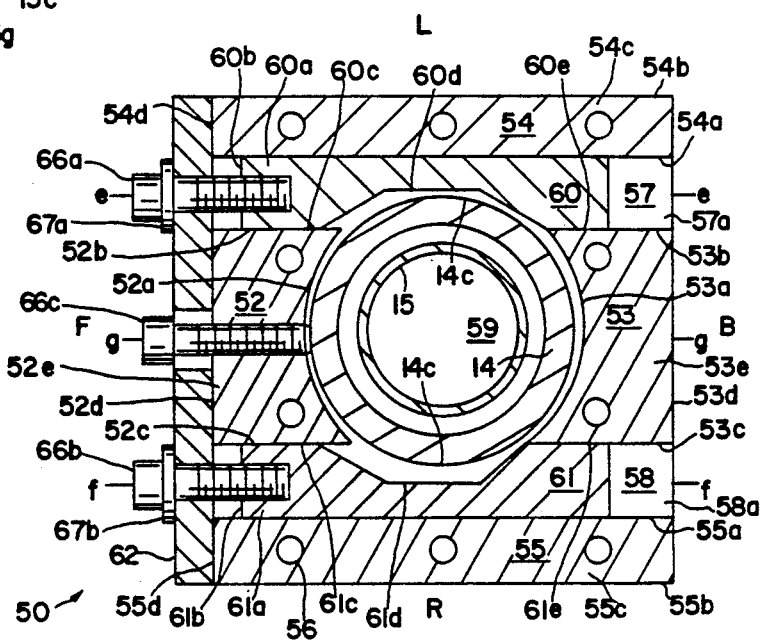
Figure 7:
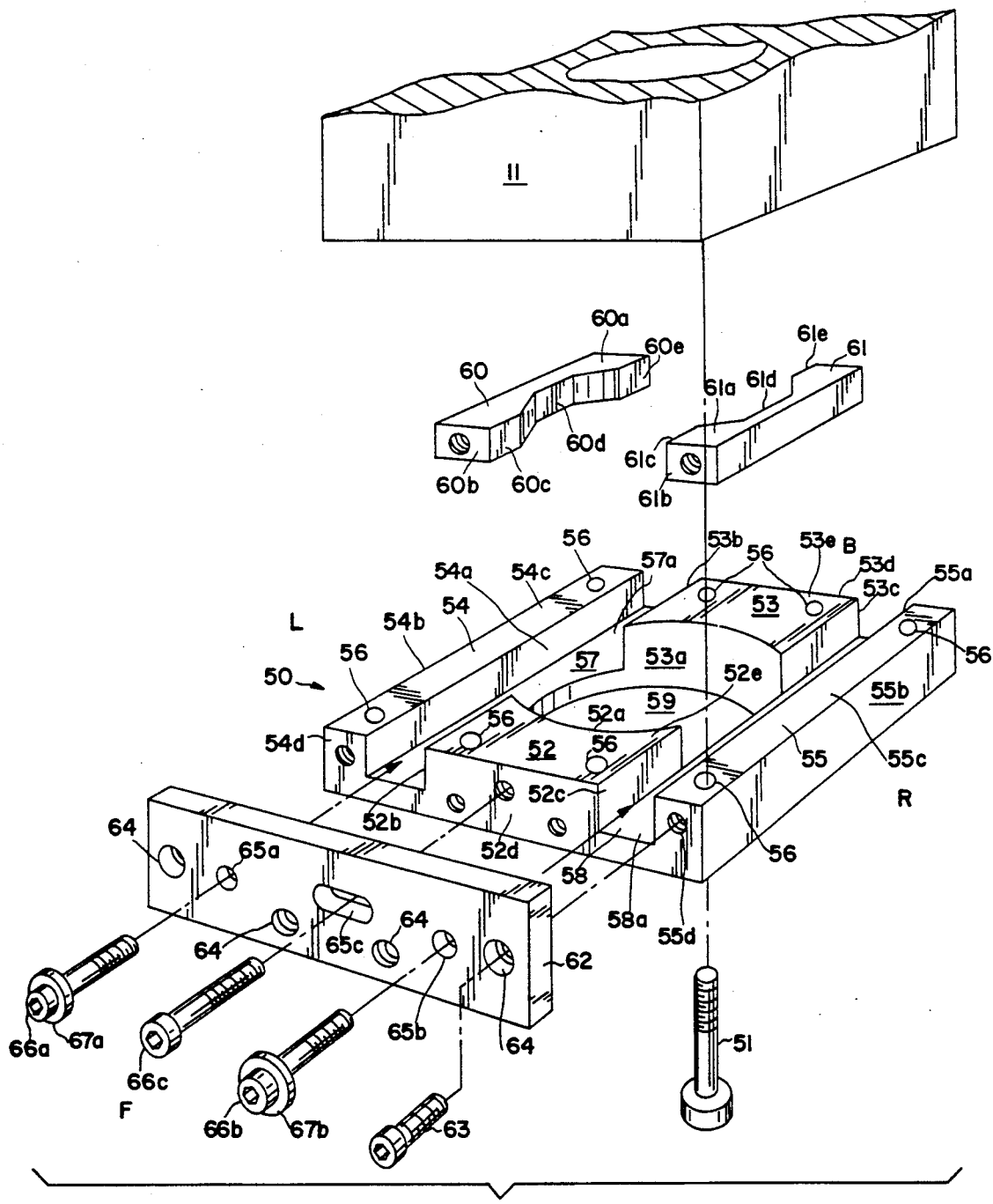
FIG. 7 is a separated perspective view of the holder assembly 50 and associated parts shown in FIG. 3.

In FIGS. 3 and 7, a holder assembly 50 is mounted on an annular member 14 and is secured by bolts 51 (one shown) onto the distal end 11b of the feed throat 11 so that the annular member 14 is spaced from the mandrel 15 and the sleeve 25 to define the discharge orifice 16. The annular member 14 has a flange 14b which fits into the lower recess 11e of feed throat 11 and the flange 14b abuts against ring 40. The holder assembly 50 includes plates 52 and 53 and lips 54 and 55 which are secured as by bolts 51 through openings 56 to the distal end 11b of the sleeve member 11.

The holder assembly 50 is provided with two parallel square cross-sectioned channels 57 and 58 with inner wall 54a of lip 54 and inner wall 55a of lip 55 defining two parallel planes spaced apart on either side of the a—a axis. Channels 57 and 58 are adjacent to spaced apart lips 54 and 55, respectively. The bottom 57a of channel 57 and the bottom 58a of channel 58 are in a common plane perpendicular to the a—a axis. The inner wall 54a of lip 54 and the left walls 53b of plate 53 and 52b of plate 52 form channel 57. The inner wall 55a of lip 55 and the right walls 53c of plate 53 and 52c of plate 52 form channel 58. The wall 54b of lip 54 forms the left side L of holder 50 and the right wall 55b of lip 55 forms the right side R of holder 50.

Between channels 57 and 58 is front plate section 52 and a back plate section 53. A cylindrical opening 59 is provided in between plate sections 52 and 53 such that the center of opening 59 is on the a—a axis with a portion cutting into each channel 57 and 58. The wall 53d of plate 53 forms part of the back side B of holder 50. The left wall 53b of plate 53 forms part of the inner wall of channel 57. The right wall 53c of plate 53 forms part of the channel 58. An arcuate side 53a of the section 53 forms part of the opening 59 and is intermediate sides 53b and 53c.

Side 52d of plate 52 forms part of the front side F of holder 50. The left wall 52b of plate 52 forms part of the channel 57. The right wall 52c of plate 52 forms part of channel 58. The arcuate side 52a of plate 52 forms part of the opening 59 and is intermediate sides 52b and 52c.

Cam 60 has a square cross-section and fits into channel 57 such that the top side 60a of cam 60 is flush with the top side 55c of lip 55 and the top sides 52e and 53e of plates 52 and 53, respectively Side 60d of cam 60 which is adjacent opening 59 has a semi-hexagonal shape intermediate side 60c which is adjacent side 52b of plate 52 and side 60e which is adjacent side 53b of plate 53.

Cam 61, a mirror image of cam 60, has a square cross-section which fits into channel 58 such that the top side 61a of cam 61 is flush with the top side 55c of lip 55 and the top sides 52e and 53e of plates 52 and 53, respectively. Side 61d of cam 61, which is adjacent opening 59, has a semi-hexagonal shape intermediate side 61c which is adjacent side 52c of plate 52 and side 61e which is adjacent side 53c of plate 53.

Adjusting plate 62 is mounted between the lips 54 and 55 on the front side F of holder 50 and on front side 52d of plate 52. Adjusting plate 62 is secured by bolts 63 (one shown) through openings 64 to the front side 54d of lip 54, to the front side 55d of lip 55, and to the front side 52d of plate 52. Adjusting plate 62 has three openings 65a, 65b and 65c between lips 54 and 55 which accommodate adjusting bolts 66a, 66b and 66c, respectively. Adjusting bolts 66a and 66b are accompanied by washers 67a and 67b, respectively, the washers 67a and 67b being intermediate bolt heads 66a and 66b and the front of adjusting plate 62.

Adjusting bolt 66a is rotatably mounted through adjusting plate 62 and is threaded into the front side 60b of cam 60 mounted in channel 57. The e—e axis of bolt 66a is perpendicular to the a—a axis and is centered on channel 57. Similarly, adjusting bolt 66b is rotatably mounted through adjusting plate 62 and is threaded into the front side 61b of cam 61 which resides in channel 58. The f—f axis of bolt 66b is perpendicular to the a—a axis and is centered on the channel 58. Axis e—e and f—f are parallel. Adjusting bolt 66c is rotatably mounted through the center of adjusting plate 62 and threaded through plate 52 such that the g—g axis of bolt 66c is perpendicular to and bisects the a—a axis and is parallel with and in the same plane as the e—e axis of bolt 66a and the f—f axis of bolt 66b.

Bolts 66a and 66b urge the cam surfaces 60d and 61d respectively, onto the outside surface 14c of the annular member 14 and move the annular member 14 relative to mandrel 15 so that the dimensions of orifice 16 are changed. Bolt 66c which is threaded through plate 52 and directly engages annular member 14, moves the annular member 14 relative to mandrel 15 so that the dimensions of orifice 16 are changed.

Diehead assembly 10 is fitted with four circular heaters 68a, 68b, 68c and 68d, which maintain the plastic flowing through the diehead opening 10 in a viscous and extrudable state. Circular heater 68a is attached to the outside circumference 33d of nozzle 33 adjacent to flange 33c. Heaters 68b and 68c are attached to the outside circumference 11g of feed throat 11 opposite cylindrical passage 11d. The fourth heater 68d is attached to the outside circumference 14c of annular member 14 below the holder assembly 50.

Figure 5:
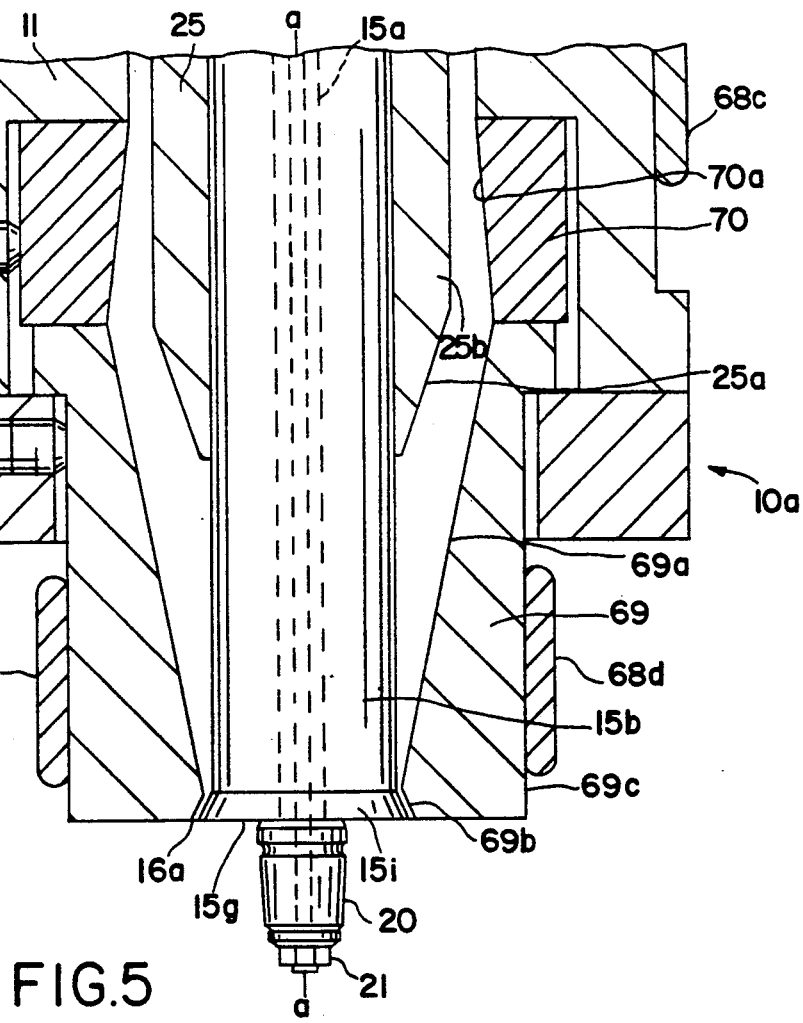

FIG. 5 shows the die head assembly 10a of the present invention including mandrel 15 having a circular cross-section along axis a—a. The lower end 15b of mandrel 15 has a conical section 15h that inclines downward and outward from the a—a axis and which provides the inside surface of the discharge orifice 16a. Holder assembly 50 mounts an annular member 69 onto a distal end 11b of feed throat 11 as in FIGS. 3 and 7. Feed throat 11 is provided with a lower cylindrical recess 11e around the axis a—a into which is mounted an adjusting ring 70 which is in contact with hex head set screws 71 (one shown) through the side wall 11f of the feed throat 11 around the axis a—a. The ring 70 provides for a rough adjustment of the flow of plastic past surface 70a which is in spaced apart relationship to the lower part of intermediate section 25b of sleeve 25. Annular member 69 has an inside surface with an upper section that tapers downward and inward 69a toward the a—a axis. The bottom section 69b of the annular member 69 inclines downward and outward from the a—a axis forming the outside surface of the discharge orifice 16a. Circular heater 68d is attached to the outside circumference 69c of annular member 69.

Figure 6:
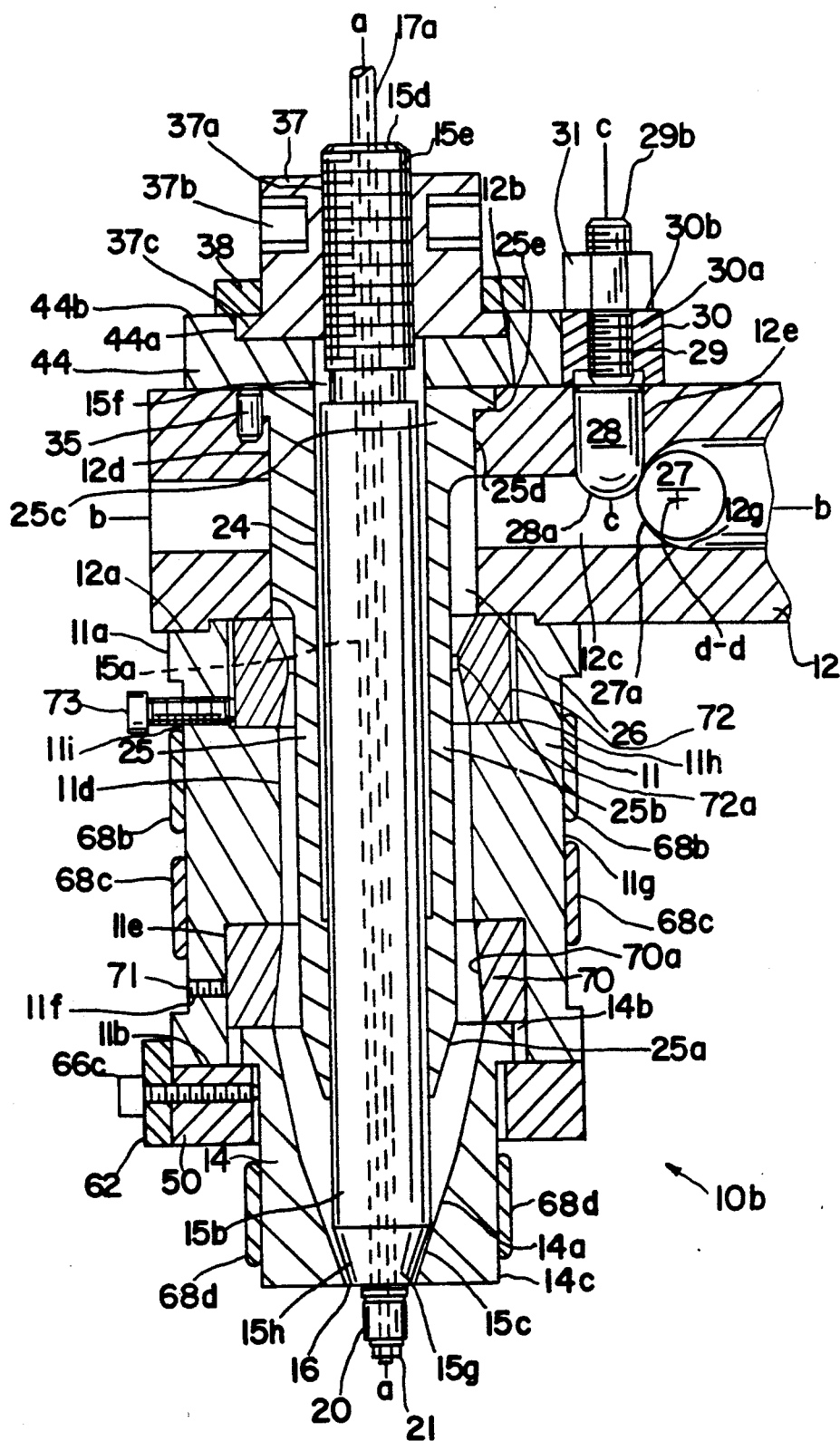

FIG. 6 shows a plan view of the die head assembly 10b similar to the diehead described in FIG. 2. The feed throat 11 has an upper conical recess 11h into which is mounted an adjusting ring 72 spaced around the mandrel sleeve 15 which is in contact with set screws 73 (one shown) through the side wall 11i of the feed throat 11 spaced around the mandrel sleeve 15. The ring 72 provides for adjustment of the flow of plastic past surface 72a which is in closely spaced relationship to the upper part of intermediate section 25b of sleeve 25. A choke member 28 is provided in passage 12c which is identical to that shown in FIG. 2 except that threaded member 29 has an Allen head screw 29b for adjusting choke member 28.

Operation

The diehead 10 is assembled so that the mandrel 15 and annular member 14 are oriented so that the dimension of the orifice 16 is approximately uniform around the axis a—a. The extrusion machine (not shown) is then activated with heaters 68a, 68b, 68c and 68d operational, plastic flows through inlet passage 34, passage 12c, annular passage 26 and out orifice 16.

As shown in FIG. 2 the orifice 16 is adjusted by the holder assembly 50 as shown in the following Table 1, where the screws 66a and 66b move cams 60 and 61 and screw 66c moves the annular member 14.

TABLE 1

| Determine Which Way The Die is to be Moved and Then: | |
| --- | --- |
| To move annular member 29 to front (F) | Screw 66c - CCW |
| | Screw 66a - CW |
| | Screw 66b - CW |
| To move annular member 29 to rear (R) | Screw 66a - CCW |
| | Screw 66b - CCW |
| | Screw 66c - DW |
| To move annular member 29 to left (L) | Screw 66a - CCW |
| | Screw 66c - CW |
| To move annular member 29 to right (R) | Screw 66b - CCW |
| | Screw 66a - CW |

Where
CW = clockwise and
CCW = counter-clockwise

As can be seen, very precise movements of the annular member 14 around the axis a—a can be achieved.

Figure 8:
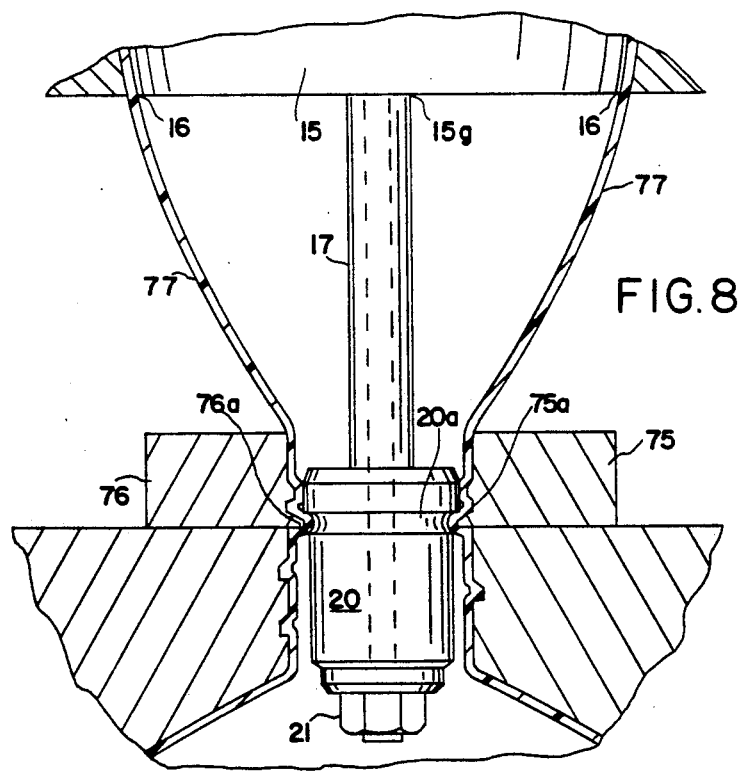
FIG. 8 is a schematic view showing the operation of a blow pin tube 17 and blow pin head 20 during a molding cycle.

The mandrel 15 is tubular with a circular cross-sectioned opening 15g along its inside length (FIG. 3). Before a molding cycle, the blow pin tube 17 is retracted inside the mandrel 15 with the blow pin head 20 positioned directly adjacent and beneath the opening 15g as shown in FIG. 2. The molding process begins with the mold cope 75 and mold drag 76 separated in the open positions as shown in FIG. 8 and the parison 77 is formed from the orifice 16. The center line between the cope 75 and drag 76 is positioned to the left of the a—a axis to provide for sufficient parison 77 contacts in the back of the drag 76 to insure proper formation of the container neck.

The center line for forming the neck between the cope 75 and drag 77 then shifts to the a—a axis and the blow pin head 20 hydraulically strokes a predetermined distance down and out of the mandrel 15. The cope 75 and drag 76 then close on the blow pin head 20, allowing the blow pin tube 17 and blow pin head 20 to pressure up the mold causing the parison 77 to conform to the shape of the cope 75 and drag 76.

Some distance down from the top of the cope 75 and drag 76 are shearing wedges 75a and 76a, respectively, which fit into the circular groove 20a of the blow pin head 20. When the blow pin head retracts up into the mandrel 15 during the upstroke the cope and drag shearing wedges 75a and 76a act to form the neck of the container and to separate the mold contained from the extruded parison It is intended that the foregoing description be only illustrative of the present invention and that the present invention be limited only by the hereinafter appended claims.

I claim:

1. An adjustable diehead for extrusion of a plastic tube which comprises:
   (a) a mandrel means having a central longitudinal axis;
   (b) a housing means mounted around and supporting the mandrel means along the longitudinal axis with an inlet opening for the plastic and defining a first passage connected to the inlet opening around the mandrel means for extrusion of the plastic;

(c) a first annular means mounted on the housing means around the mandrel means, the first annular means providing a second passage continuous with the first passage and defining an outlet opening between an inside surface of the first annular means and an outside surface of the mandrel means, spaced from the longitudinal axis of the mandrel means, for extrusion of the plastic tube;

(d) dual spaced apart first and second bar cam means mounted opposite each other around the longitudinal axis of the mandrel means with each of the bar cam means having an intermediate portion moveable against opposed portions of the outside surface of the first annular means;

(e) a holder means mounted on the housing means around the first annular means for supporting the dual bar cam means for movement against the outside surface of the first annular means;

(f) a first adjustment means mounted on the holder means to enable an operator to affect a first engagement with the first annular means to cause a first adjustment of the outlet opening between the first annular means and the mandrel means; and (g) a second and a third adjustment means mounted on the holder means and connected to the respective first and second bar cam means to enable the operator to affect a second and third engagement with the first annular means, with the first adjustment means between and adjacent to the second and the third adjustment means so that the first adjustment means together with the second and the third adjustment means of the dual bar cam means provide for annular engagement of the first annular means to affect an annular change in the outlet opening between the first annular means and the mandrel means and wherein in use the diehead is mounted on a plastic extrusion machine with the holder means having a front portion providing for mounting the first, second and third adjustment means facing the operator so that the operator can affect the first, second and third engagements of the first annular means, while the extrusion machine is operating, each engagement being independent of the other.

2. The diehead of claim 1 wherein the mandrel means and the first annular means have a circular cross-section at the outlet opening.

3. The diehead of claim 2 wherein the mandrel means has an outward taper away from the longitudinal axis adjacent to the outlet opening.

4. The diehead of claim 2 wherein the mandrel means has an inward taper towards the longitudinal axis adjacent to the outlet opening.

5. The diehead of claim 1 wherein each of the bar cam means are supported in parallel slots in the holder means and wherein the intermediate portion of each of the bar cam means have opposed cam means portions intermediate of opposed ends of the bar means which cam means portions engage opposed outside portions of the outside surface of the first annular means.

6. The diehead of claim 1 wherein a fourth adjustment means is provided on the housing means adjacent a second annular means mounted on the housing means near the inlet opening of the housing means, wherein the fourth adjustment means provides for adjusting the flow of plastic entering the second passage between the mandrel means and the second annular means.

7. The diehead of claim 1 mounted on an extrusion machine.

8. The diehead of claim 1 wherein the first, second and third adjustment means are threaded members.

9. An adjustment mechanism for mounting on a diehead with a mandrel means having a longitudinal axis and a housing means mounted around and supporting the mandrel means along the longitudinal axis and having an inlet opening for a plastic and defining a first passage connected to the inlet opening around the mandrel means for extrusion of the plastic as a tube which comprises:

(a) a first annular means for mounting on the housing means around the mandrel means, the first annular means providing a second passage continuous with the first passage and defining an outlet opening formed by an inside surface of the first annular means and an outside surface of the mandrel means, spaced from the longitudinal axis of the mandrel means, for extrusion of the plastic tube;

(b) dual spaced apart first and second bar cam means mounted opposite each other around the longitudinal axis of the mandrel means with each of the bar cam means having an intermediate portion moveable against opposed portions of the outside surface of the first annular means to change the outlet opening between the first annular means and the mandrel means;

(c) a holder means for mounting on the housing means around the first annular means for supporting the dual bar cam means for movement against the outside surface of the first annular means;

(d) a first adjustment means mounted on the holder means to enable an operator to affect a first engagement with the first annular means to cause a first adjustment of the outlet opening between the first annular means and the mandrel means; and (e) a second and a third adjustment means mounted through the holder means and connected to the respective first and second bar cam means to enable the operator to affect a second and a third engagement with the first annular means, with the first adjustment means between and adjacent to the second and the third adjustment means so that the first adjustment means together with the second and the third adjustment means of the dual bar cam means provide for annular engagement of the first annular means to affect an annular change in the outlet opening between the first annular means and the mandrel means and wherein in use the diehead is mounted on a plastic extrusion machine with the holder means having a front portion providing for mounting the first, second and third adjustment means facing the operator so that the operator can affect the first, second and third engagements of the first annular means while the extrusion machine is operating, each engagement being independent of the other.

10. The adjustment mechanism of claim 9 wherein the mandrel means and the first annular means have a circular cross-section at the outlet opening.

11. The adjustment mechanism of claim 10 wherein the mandrel means has an outward taper away from the longitudinal axis adjacent to the outlet opening.

12. The adjustment mechanism of claim 10 wherein the mandrel means has an inward taper towards the longitudinal axis adjacent to the outlet opening.

13. The adjustment mechanism of claim 9 wherein each of the bar cam means are supported in parallel slots in the holder means and wherein the intermediate portion of each of the bar cam means have opposed cam means portions intermediate of opposed ends of the bar means which cam means portions engage opposed portions of the outside surface of the first annular means.

14. The adjustment mechanism of claim 9 wherein a fourth adjustment means is provided on the housing means adjacent a second annular means mounted on the housing means near the inlet opening of the housing means, wherein the fourth adjustment means provides for adjusting the flow of plastic entering the second passage between the mandrel means and the second annular means.

15. The adjustment mechanism of claim 9 wherein the first, second and third adjustment means are threaded members.

16. A method for adjusting a diehead for extrusion of a plastic tube which comprises:
(a) providing an adjustable diehead for extrusion of a plastic tube which comprises: a mandrel means having a central longitudinal axis; a housing means mounted around and supporting the mandrel means along the longitudinal axis with an inlet opening for the plastic and defining a first passage connected to the inlet opening around the mandrel means for extrusion of the plastic; an annular means mounted on the housing means around the mandrel means, the annular means providing a second passage continuous with the first passage and defining an outlet opening between an inside surface of the annular means and an outside surface of the mandrel means, spaced from the longitudinal axis of the mandrel means, for extrusion of the plastic tube; dual spaced apart first and second bar cam means mounted opposite each other around the longitudinal axis of the mandrel means with each of the bar cam means having an intermediate portion moveable against opposed portions of the outside surface of the annular means to change the outlet opening between the annular means and the mandrel means; a holder means mounted on the housing means around the annular means for supporting the dual bar cam means for movement against the outside surface of the annular means; a first adjustment means mounted on the holder means to enable an operator to affect a first engagement with the annular means to cause a first adjustment of the outlet opening between the annular means and the mandrel means; and a second and third adjustment means mounted on the holder means and connected to the respective first and second bar cam means to enable the operator to affect a second and a third engagement with the annular means, with the first adjustment means between and adjacent to the second and the third adjustment means so that the first adjustment means together with the second and third adjustment means of the dual bar cam means provide for annular engagement of the annular means to affect an annular change in the outlet opening between the annular means and the mandrel means and wherein in use the diehead is mounted on a plastic extrusion machine with the holder means having a front portion providing for mounting the first, second and third adjustment means facing the operator so that the operator can affect the first, second and third engagements of the annular means while the extrusion machine is operating, each engagement being independent of the other; and
(b) adjusting the outlet orifice between the annular means and the mandrel means by adjusting the first adjustment means to engage the annular means and by adjusting the second and the third adjustment means to cause the intermediate portions of the first and the second bar cam means to engage the opposed portions of the outside surface of the annular means to thereby provide a plastic tube having a wall thickness which is uniform.

17. The method of claim 16 wherein the first, second and third adjustment means are a first, a second and a third threaded member.

18. The diehead of claim 6 wherein the mandrel means is adjustably supported by the housing means so that the mandrel means is axially adjustable along the longitudinal axis with respect to the first annular means to provide a fifth adjustment means for the outlet opening between the first annular means and the mandrel means.

19. The diehead of claim 18 wherein the mandrel means is threadably supported in the housing means to provide the fifth adjustment means wherein when the mandrel is rotated in a first direction, the mandrel means is adjusted axially along the longitudinal axis to increase the outlet opening and wherein when the mandrel means is rotated in a second direction, the mandrel means is adjusted axially along the longitudinal axis to decrease the outlet opening between the first annular means and the mandrel means.

20. The diehead of claim 7 wherein there are a plurality of dieheads mounted in a battery on an extrusion machine with each of the dieheads provided with a holder means having first, second and third adjustment means on their respective holder means, the holder means having a front side provided by a plane parallel with and intersecting the longitudinal axis of the respective mandrel means and through the holder means, so that in use, the operator can access the first, second and third adjustment means of each of the holder means for affecting the first, second and third engagements of the first annular means of each of the dieheads, while the extrusion machine is operating.

21. The adjustment mechanism of claim 14 wherein the mandrel means is adjustably supported by the housing means so that the mandrel means is axially adjustable along the longitudinal axis with respect to the first annular means to provide a fifth adjustment means for the outlet opening between the first annular means and the mandrel means.

22. The adjustment mechanism of claim 21 wherein the mandrel means is threadably supported in the housing means to provide the fifth adjustment means such that when the mandrel means is rotated in a first direction, the mandrel means is adjusted axially along the longitudinal axis to increase the outlet opening and wherein when the mandrel means is rotated in a second direction, the mandrel means is adjusted axially along the longitudinal axis to decrease the outlet opening between the first annular means and the mandrel means.

23. The adjustment mechanism of claim 9 wherein there are a plurality of dieheads mounted in a battery on an extrusion machine with each of the dieheads provided with a holder means having first, second and third adjustment means on the respective holder means, the holder means having a front side provided by a plane parallel with and intersecting the longitudinal axis of the respective mandrel means and through the holder means, so that in use, the operator can access the first, second and third adjustment means of each of the holder means for affecting the first, second and third engagements of the first annular means of each of the dieheads, while the extrusion machine is operating.

* * * * *